(12) United States Patent
Missotten et al.

(10) Patent No.: US 10,065,691 B2
(45) Date of Patent: Sep. 4, 2018

(54) COMBINE HARVESTER WITH TRACK UNITS EQUIPPED WITH TILT-COUNTERACTING ACTUATORS

(71) Applicant: CNH Industrial America LLC, New Holland, PA (US)

(72) Inventors: Bart M. A. Missotten, Herent (BE); Koen Landuyt, Adegem (BE)

(73) Assignee: CNH Industrial America LLC, New Holland, PA (US)

( * ) Notice: Subject to any disclaimer, the term of this patent is extended or adjusted under 35 U.S.C. 154(b) by 11 days.

(21) Appl. No.: 15/112,651

(22) PCT Filed: Jan. 19, 2015

(86) PCT No.: PCT/EP2015/050836
§ 371 (c)(1),
(2) Date: Jul. 19, 2016

(87) PCT Pub. No.: WO2015/110373
PCT Pub. Date: Jul. 30, 2015

(65) Prior Publication Data
US 2016/0332681 A1    Nov. 17, 2016

(30) Foreign Application Priority Data

Jan. 21, 2014  (BE) .................................. 2014/0030

(51) Int. Cl.
*B62D 55/02*      (2006.01)
*B62D 55/084*     (2006.01)
(Continued)

(52) U.S. Cl.
CPC ............ *B62D 55/116* (2013.01); *A01D 41/06* (2013.01); *A01D 41/12* (2013.01); *A01D 41/127* (2013.01);
(Continued)

(58) Field of Classification Search
CPC .... B62D 55/116; B62D 55/02; B62D 55/084; B62D 55/112; A01D 41/02; A01D 41/127;
(Continued)

(56) References Cited

U.S. PATENT DOCUMENTS 3,233,909 A    2/1966  Boone
4,050,704 A    9/1977  Duca et al.
(Continued)

FOREIGN PATENT DOCUMENTS

AT           009639 U1    1/2008
DE           3420233 A1   12/1985
(Continued)

*Primary Examiner* — John Weiss
(74) *Attorney, Agent, or Firm* — Peter K. Zacharias; Patrick M. Sheldrake (57) ABSTRACT

A combine harvester comprising a pair of track units at a front of the harvester. The track units are suspended so that a frame of the units is pivotable about a centrally placed pivot axis, the axis dividing the track units between a front and rear portion. For each of the track units, the harvester comprises at least one variable length actuator mounted between the chassis of the harvester and the frame of the track unit, the actuator being mounted so that it is capable of actuating an upward or downward tilting of the front portion of the track unit. The actuator is operated to counteract an excessive downward or upward tilting of the front portion of the unit. The actuator may be operated by a control mechanism working on the basis of measurements performed by suitable sensor arrangements that monitor or predict the downward or upward tilting.

16 Claims, 7 Drawing Sheets

(51) Int. Cl.
*B62D 55/112* (2006.01)
*A01D 41/06* (2006.01)
*A01D 41/12* (2006.01)
*B62D 55/116* (2006.01)
*A01D 41/127* (2006.01)
*A01F 12/18* (2006.01)
*A01F 12/44* (2006.01)
*A01D 67/00* (2006.01)

(52) U.S. Cl.
CPC ............ *A01F 12/18* (2013.01); *A01F 12/446* (2013.01); *B62D 55/02* (2013.01); *B62D 55/084* (2013.01); *B62D 55/112* (2013.01); *A01D 67/00* (2013.01)

(58) Field of Classification Search
CPC .... A01D 41/1275; A01D 41/06; A01D 41/12; A01D 67/00; A01F 12/58; A01F 12/18; A01F 12/446
See application file for complete search history.

(56) References Cited

U.S. PATENT DOCUMENTS

| | | |
|---|---|---|
| 4,247,126 A | 1/1981 | Claxton |
| 4,750,751 A | 6/1988 | Schafer |
| 5,178,402 A | 1/1993 | Love et al. |
| 5,839,954 A * | 11/1998 | Schloesser ............ A01D 45/02 460/119 |
| 6,158,203 A * | 12/2000 | Scott .................. B62D 49/0607 56/328.1 |
| 6,962,222 B2 | 11/2005 | Kirihata |
| 8,180,532 B2 | 5/2012 | O'Halloran et al. |
| 8,341,926 B2 | 1/2013 | Speckamp et al. |
| 2003/0178816 A1* | 9/2003 | Bowers .................... B60G 5/02 280/677 |
| 2013/0110389 A1* | 5/2013 | Solbrack .......... B60G 17/01908 701/124 |
| 2015/0021866 A1* | 1/2015 | Solbrack ............. B60G 15/067 280/6.155 |
| 2015/0367901 A1 | 12/2015 | Studer |

FOREIGN PATENT DOCUMENTS

| | | |
|---|---|---|
| EP | 1114577 A1 | 7/2001 |
| EP | 1522215 A1 | 4/2005 |
| GB | 1139090 A | 1/1969 |
| JP | H08238916 A | 9/1996 |
| JP | 2001000031 A | 1/2001 |
| JP | 2001000032 A | 1/2001 |
| NL | 7406446 A | 11/1974 |

\* cited by examiner

COMBINE HARVESTER WITH TRACK UNITS EQUIPPED WITH TILT-COUNTERACTING ACTUATORS

CROSS REFERENCE TO RELATED APPLICATION

This application is the National Stage of International Application No. PCT/EP2015/050836 filed Jan. 19, 2015, which claims priority to Belgian Application No. 2014/0030 filed Jan. 21, 2014, the contents of which are incorporated herein by reference.

FIELD OF THE INVENTION

The present invention is related to combine harvesters for gathering and processing crop material from a field, in particular to harvesters equipped with tracks or equivalent ground engaging means.

BACKGROUND OF THE INVENTION

On terrains which require a higher grip, combine harvesters may be equipped with a pair of track units instead of front wheels. Different types of track units are in use in present day harvesters. Flat track units comprise a set of guide wheels of equal diameter, guiding a rubber track in the shape of an elongated loop, with bogie wheels in between the two guide wheels. One of the two guide wheels acts as the driver wheel via a suitable drive mechanism connected to the harvester's power source. An example of such a flat track unit is shown in U.S. Pat. No. 5,566,773. Triangular track units have two guide wheels resting on the floor and a third guide wheel above these two and centrally placed, the upper guide wheel usually acting as the drive wheel, with the track moving in the form of a triangular loop about these three guide wheels, and equally with bogie wheels in between the two lower guide wheels. The latter type of track unit is illustrated for example in EP-A-2130749. Equivalent trackless ground engaging means exist wherein the two guide wheels that are in contact with the ground are replaced by wheels provided with tyres.

Regardless of the type of track or equivalent unit applied, the track units are usually suspended on the harvester's chassis in a central point, about which a pivoting movement of the entire unit is allowed with respect to the chassis, so that the unit may tilt up and down in order to adapt to the unevenness of the terrain. When the terrain is exceptionally muddy or soft, this mechanism may cause the track unit to become stuck, as it tilts forwards and tends to burrow itself into the terrain.

SUMMARY OF THE INVENTION

The invention is related to a combine harvester aimed at overcoming the problems described above. Such a combine harvester is disclosed in the appended claims.

The present invention is generally related to a combine harvester comprising a pair of track units or equivalent ground engaging means at the front of the harvester. The track units are suspended from the harvester's chassis in the way known in the art, i.e. the frame of the units is pivotable about a centrally placed pivot axis, the axis dividing the track unit between a front and rear portion, so that the pivoting of the track unit results in upward and downward tilting of the front and rear portions. For each of the track units, the harvester comprises at least one variable length actuator mounted between the chassis of the harvester and the frame of the track unit, the actuator being mounted so that it is capable of actuating an upward and/or downward tilting of the front portion of the track unit. The actuator is operated to counteract an excessive downward and/or upward tilting of the front portion of the unit. The actuator may be operated by a control mechanism working on the basis of measurements performed by suitable sensor arrangements that monitor or predict the downward or upward tilting. The actuators may be part of a lifting system for the entire frame of the actuator. In the latter case, the cleaning arrangement of the harvester may be placed above the track units, the cleaning arrangement having a functional width that is larger than the distance between the track units.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The notions 'front', 'rear', 'in front of' and 'behind' used in this description and in the claims are to be understood with respect to the longitudinal direction of the harvester, i.e. the direction between the nose and tail of the harvester, the nose defining the front, and the tail defining the rear.

Figure 1:
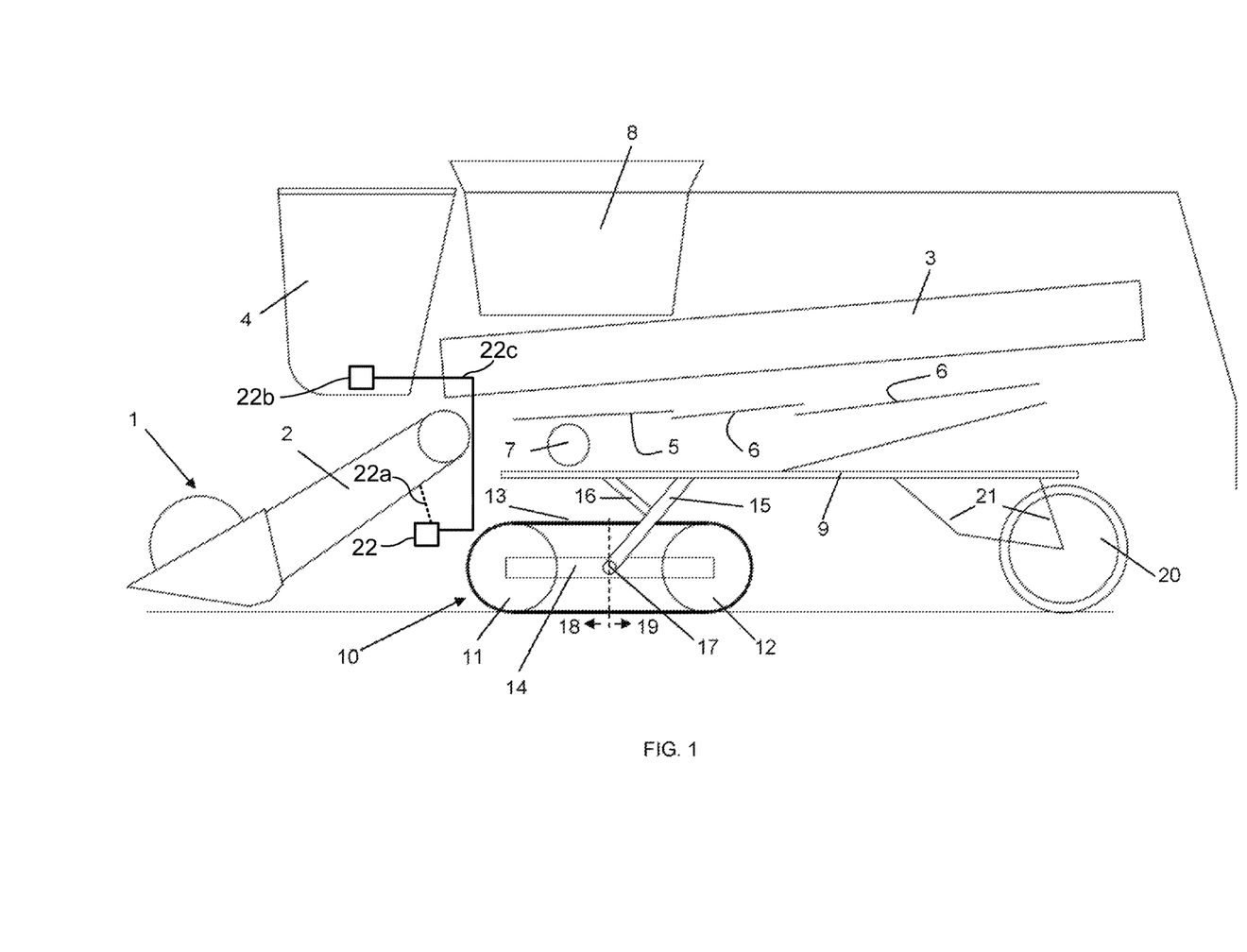
FIG. 1 shows a schematic image of a combine harvester equipped with flat track units, as known in the art.

The invention is explained with respect to a number of schematic drawings. FIG. 1 shows the main components of a combine harvester as known in the art today, equipped with a pair of flat track units 10 at the front. Crops are cut from the field by the header assembly 1, and supplied by the feeder 2 to a pair of threshing and separation rotors 3, arranged along the longitudinal direction of the harvester. The driver's cabin 4 is indicated, as well as the cleaning arrangement, comprising a reciprocating preparation pan 5, coupled to reciprocating sieves 6, and a blower 7 for blowing light residue material towards the back of the harvester as the grain falls through the sieves and is gathered in a grain tank 8. At the back of the harvester (not shown), shredder and spreader means are mounted for shredding the larger stalks and leaves transported there by the rotors, as well as the lighter residue remaining on the sieves 6 or blown back by the blower 7. Lift actuators 22, shown schematically, connect between a harvester chassis 9 and the header assembly through mechanical connection 22*a*.

The flat track units 10 comprise guide wheels 11 and 12 about which a rubber track 13 is arranged to rotate. Bogie wheels are normally present but not shown for the sake of simplicity of the drawings. One of the guide wheels is connected to the power source of the harvester by a suitable drive mechanism (not shown). The guide wheels are mounted on a track unit frame that is schematically illustrated as a beam 14, though in reality it is of course more complex and may for example comprise dampening and/or tensioning means as known as such in the art. The track unit frame 14 is mounted on the harvester's chassis 9 through a support structure, illustrated by the support beams 15/16, which are fixed to the harvester's chassis. The track unit frame 14 is pivotable about a transversal axis 17 with respect to the support structure 15/16, and thereby with respect to the chassis 9. The transversal axis 17 is lying between a front and rear portion 18 and 19 of the track unit, so that the front and rear portions may be tilted up or down by the pivoting movement of the track unit, to thereby adapt to unevenness of the terrain and to keep the chassis stable in spite of such unevenness. At the back of the harvester, a pair of wheels 20 is provided, mounted on the chassis by a suitable support structure 21 (including dampeners etc), as known as such in the art.

Figure 2:
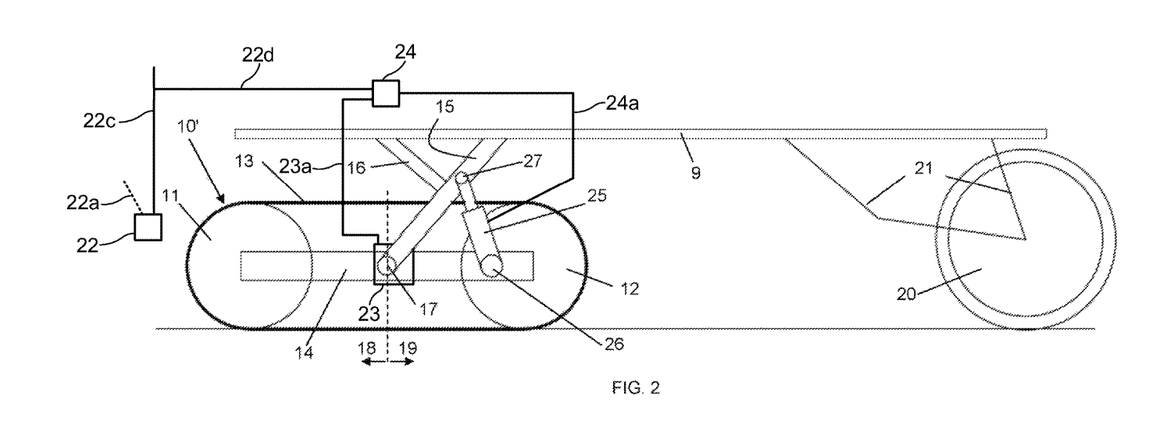
FIG. 2 illustrates the chassis and flat track units of a harvester according to an embodiment of the invention.

As explained in the introductory paragraph, the track unit's capability to pivot about the transversal axis 17 is instrumental in allowing the track to follow the unevenness of the terrain, but it may also be responsible for getting the harvester stuck by an excessive forward tilting of the track units which causes the units to burrow themselves into the terrain. Excessive upward tilting of the front portion 18 of the track units is less likely to occur on sufficiently flat fields, but may nevertheless be a problem on very uneven fields. To solve these problems, the harvester of the invention is equipped with a means for counteracting an excessive downward and/or upward tilting of the front portion 18 of the track units. FIG. 2 illustrates the operation of a flat track unit 10' in a harvester according to the invention. A variable length actuator 25 is mounted between the support beam 15 and a point 26 of the track unit's frame 14, the latter point being located behind the transversal axis 17. As the support beam 15 is immovably connected to the chassis, the actuator is thus effectively coupled between the chassis 9 and the track unit 10'.

The actuator 25 may be a pneumatic or hydraulic piston/cylinder type actuator as known as such in the art. The end points of the actuator 25 are pivotably mounted in points 26 and 27 of the track unit's frame 14 and the support beam 15 respectively. Actuation of the actuator 25 may take place in the form of a forced extension of the actuator's length, pushing the rear portion 19 of the track unit down with respect to the chassis, so that the front portion 18 of the track unit is tilted upward. This counterforce to an excessive downward tilting position of the track unit's front portion 18 may be applied, for example manually activated from the driver's cabin 4, whenever the harvester gets stuck in the above-described manner. The actuator 25 may equally operate in an automated manner, i.e. by applying a counterforce whenever the downward tilting of the track unit's front portion 18 exceeds a pre-defined value. This may be detected by any suitable sensor arrangement, for example a rotational movement sensor 23, shown schematically, placed on the pivot axle 17 of the track unit. The output of sensor 23 is fed to a controller 24, also shown schematically, through line 23*a*. Controller 24 operates actuator 25 through line 24*a*. As an alternative to or in addition to such a direct measurement of the tilting position of the track units, the type of terrain where an excessive forward tilting of the track units is likely to occur can be detected before such forward tilting actually takes place for example by monitoring the pressure through line 22*d* to controller 24 in lift actuators 22 (schematically shown in FIG. 1 and FIG. 2) configured to lift and position the header assembly 1 through mechanical connection 22*a* with respect to the ground. These actuators are also piston/cylinder type actuators and are known as such in present day harvesters. During harvesting, an area of muddy terrain where the harvester's track units are in danger of becoming stuck can be detected by a significant pressure drop in one of the piston chambers of these actuators. Such a pressure drop can be used as a trigger for activating the actuators 25 in the track units.

According to still another embodiment, measurement of the pressure in the actuators 25 themselves (or its equivalents shown in further embodiments described hereafter) is used as a very fast indicator, detectable as soon as the track unit begins to engage an unstable area into which the unit is likely to become stuck by excessive forward tilting. This is another way of activating the actuators 25 even before excessive forward tilting takes place.

According to another embodiment, a measurement of the harvester's inclination angle in the longitudinal direction, i.e. measurement of the angle of an upward or downward slope on which the harvester is climbing or descending, is done and the result is used as an input for activating the actuators 25 (or any equivalent described hereafter) to thereby control the tilting of the track units as a function of the harvester's inclination. On a downward slope, a higher upward tilt of the track unit's front portion 18 with respect to the chassis may be applied than on an upward slope. This embodiment thus requires a sensor for measuring the inclination angle of the harvester as a whole (this type of sensor is known and applied in present day harvesters), and a sensor that measures the tilt of the track units with respect to the chassis (for example a rotation sensor on the pivot axis). The 'tilt angle of the track units with respect to the chassis' is measured with respect to a reference position, preferably the 'horizontal' position of the harvester, i.e. the position when the harvester is on a flat horizontal surface with the actuators 25 in an inactive state. The actuators 25 are preferably controlled in such a way that the track unit's front portion 18 is constantly tilted upward, the tilt angle with respect to the chassis being for example between 0.5 and 1 degrees, depending on the slope angle and the drive direction. So even on a flat horizontal surface, the track units are then constantly tilted upwards slightly, which is beneficial for avoiding that the tracks become stuck.

Figure 3:
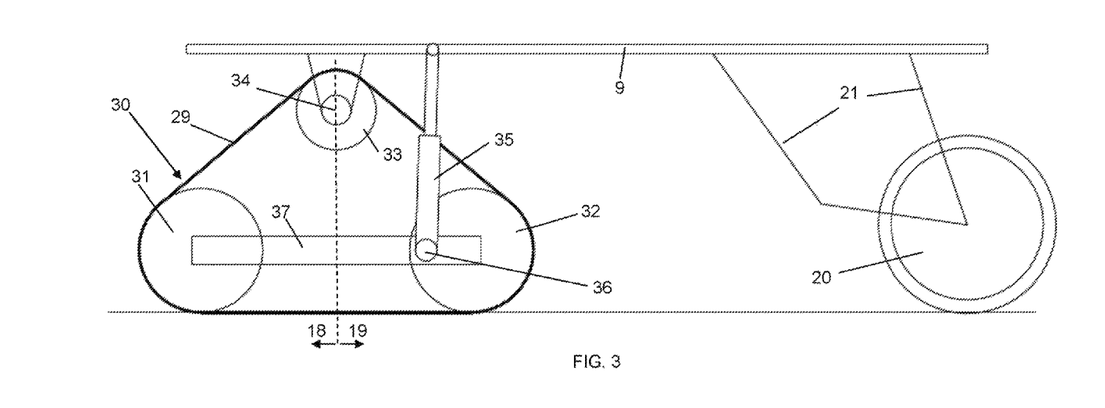
FIG. 3 illustrates the chassis and triangular track units of a harvester according to an embodiment of the invention.

FIG. 3 shows a harvester equipped with a pair of triangular-type track units 30, each unit being provided with a front and rear guide wheel 31 and 32, and a central guide wheel 33 for driving a rubber track 29. The central guide wheel 33 is driven by the power source of the harvester through a suitable drive mechanism (not shown). The track unit is pivotable about the rotation axis 34 of the drive wheel 33, so that the front and rear portions 18/19 of the unit may be tilted up and down, as in the case of the flat track unit of FIG. 2. An actuator 35 is again mounted between the harvester's chassis 9 and a point 36 on the track unit frame 37. The connection point 36 is located behind the pivot axis 34 of the track unit. The function of the actuator 35 is the same as the function of the actuator 25 in the embodiment of FIG. 2.

Figure 4A:
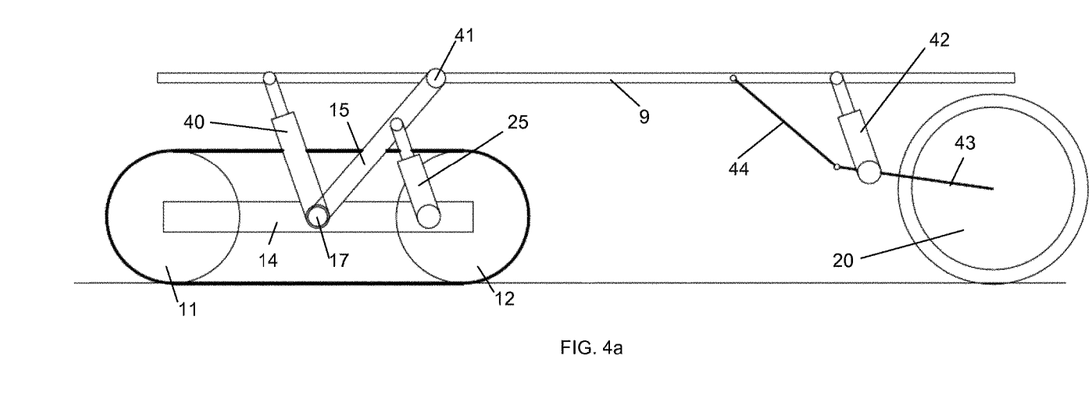
FIGS. 4a and 4b illustrate an embodiment wherein the entire chassis can be lifted up over a given distance.
Figure 4B:
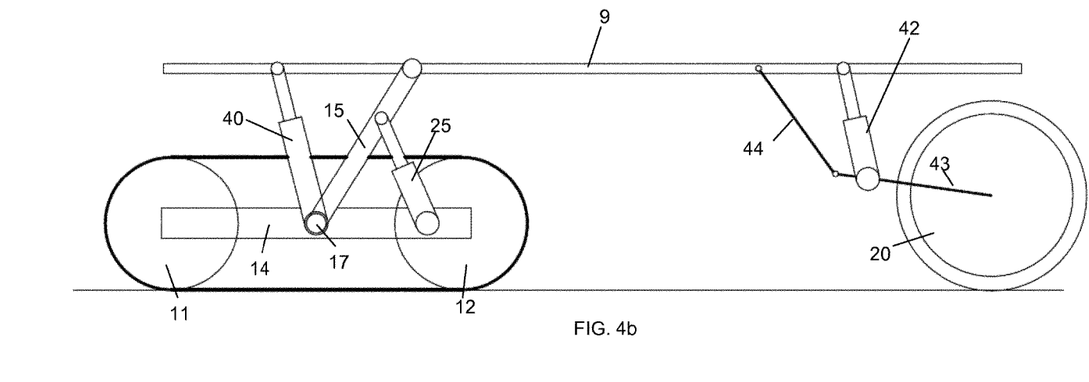

According to an embodiment, the actuators 25 or 35 may be part of a lifting and/or levelling mechanism configured to lift up the entire chassis 9 of the combine harvester and/or to level the chassis by lifting up the front or rear portion of the chassis separately. This embodiment is illustrated in FIGS. 4a and 4b for the case of a harvester equipped with flat track units 10'. A lift actuator 40 is mounted between the pivot axis 17 and the chassis 9. The support beam 15 is now pivotable with respect to the chassis 9 in its attachment point 41. At the back of the harvester, actuators 42 are mounted between the chassis and the beams 43 carrying the rear axle of the wheels 20. The support beam 44 is pivotable at both ends. In a levelling system, the lift actuators 40 and 42 can be operated separately.

The drawing in FIG. 4b shows the chassis in an elevated position with respect to the position shown in FIG. 4a. It is clearly visible how the assembly of actuators and pivotable beams works as a lifting mechanism for the chassis. At each height of the chassis, the actuators 25 (one in each track unit), retain their function of stabilising the track unit by counteracting an excessive forward tilting of the track unit 10'.

Figure 5:
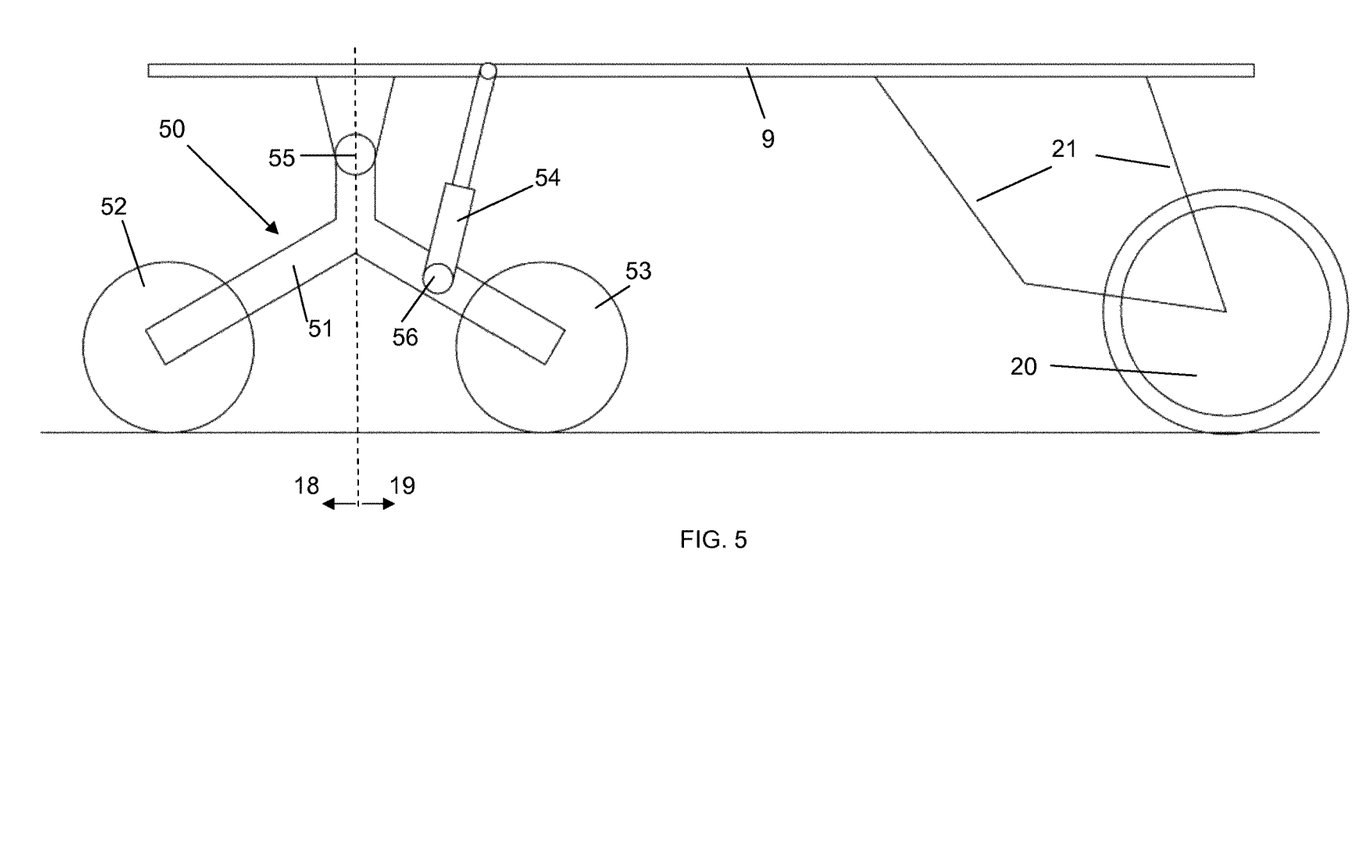
FIG. 5 illustrates the chassis and a trackless ground engaging means in a harvester according to the invention.

FIG. 5 shows an example of a trackless ground engaging means 50 to which the invention may equally be applied. The ground engaging means in this embodiment is a pivotable frame 51 carrying a front and rear wheel 52/53 (or preferably a front pair of wheels arranged on an axle at the front of the frame 51 and a rear pair of wheels arranged on an axle at the rear of the frame 51). An actuator 54 is again mounted between the chassis 9 and a point 56 located behind the pivot axis 55.

Figure 6A:
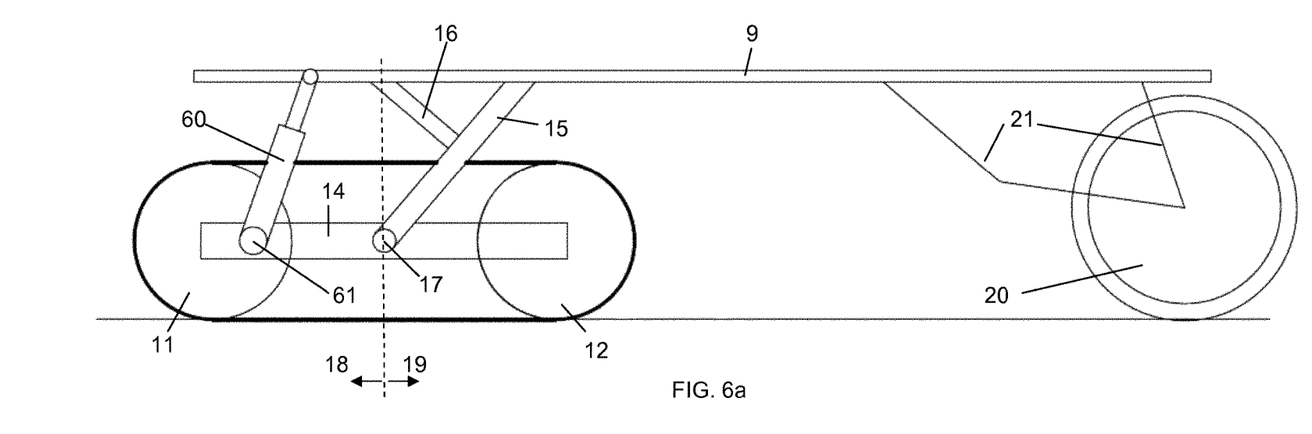
FIGS. 6a and 6b illustrate alternative configurations of the mounting locations and the number of actuators in a harvester according to the invention.
Figure 6B:
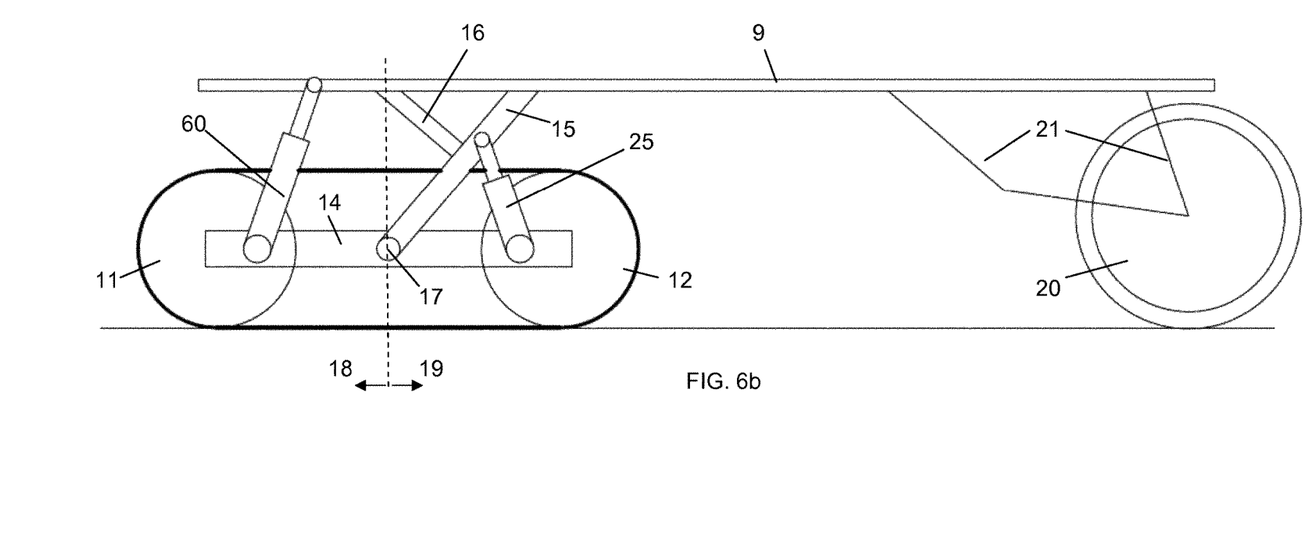

In a variation on any of the above-described embodiments, illustrated in FIG. 6a, a variable length actuator 60 may be mounted between the chassis 9 and a point 61 of the frame 14 located in front of the lateral pivot axis 17, wherein the actuator 60 is configured to exert a pulling force on the front portion 18 of the ground engaging means, to thereby counteract the above described excessive forward tilting of the ground engaging means. According to another embodiment, illustrated in FIG. 6b, two actuators 60 and 25 may be mounted between the chassis 9 and the front and rear portions 18/19 of the ground engaging means respectively. The actuators 60/25 are then configured to cooperate in counteracting the above-described excessive forward tilting of the ground engaging means.

Figure 7A:
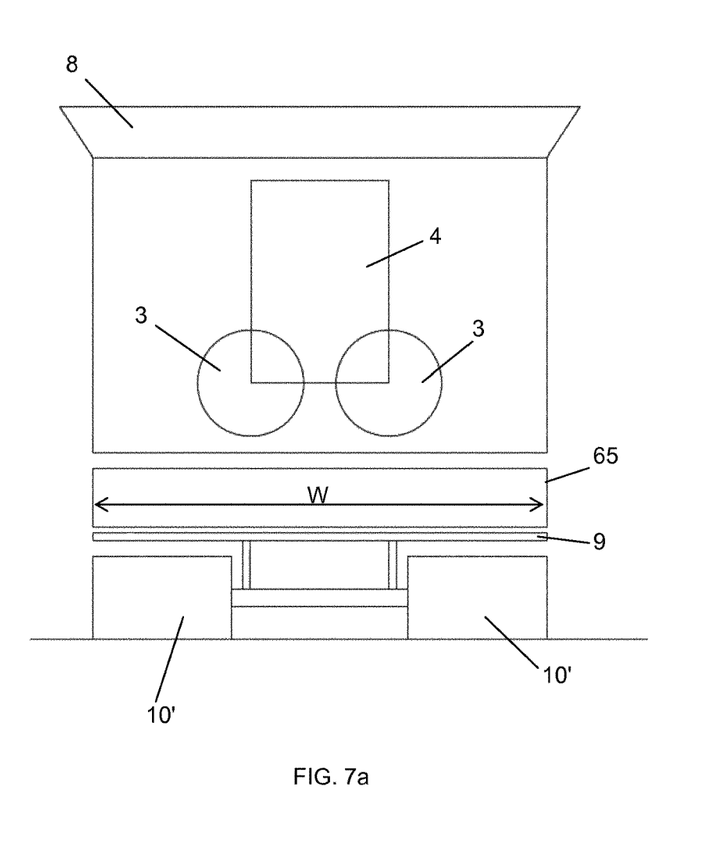
FIGS. 7a and 7b illustrate a harvester according to the invention equipped with a cleaning arrangement having a functional width that is larger than the distance between the two front track units of the harvester.
Figure 7B:
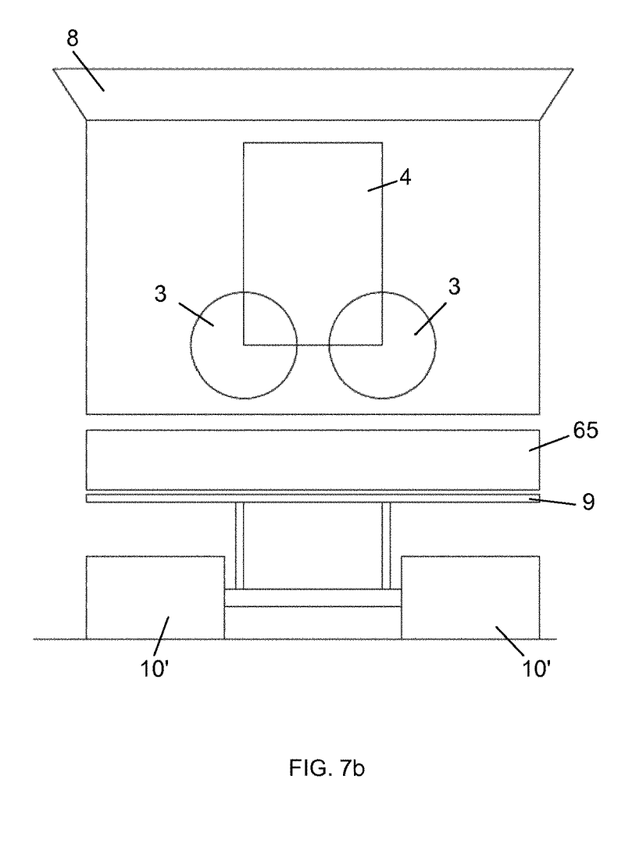

According to an embodiment wherein the actuator is part of a lifting and/or levelling system for the entire chassis, the functional width W of the cleaning arrangement is wider than the distance between the front track units 10', and the cleaning arrangement 65 extends laterally above the track units, see FIG. 7. The functional width W is defined as the width of the cleaning pan 5 and/or the sieves 6, whichever (if any) is the larger. The harvester may then be operated in 'low' mode and 'high' mode defined by a retracted and an extended position of the lifting mechanism. In the low mode (FIG. 7a), the harvester is adapted for travel on hardened roads such as most public roads, where compliance with vehicle height limitations is required. Lowering of the distance between the cleaning arrangement 65 and the track units 10' is not a problem given that on flat terrain the track units are not subjected to large tilting movements. In the high mode, the harvester is adapted for field operation. The tracks are allowed more tilting space so as to adapt to the more important unevenness of the terrain compared to flat roads. On the field, the harvester generally moves slower and is not subjected to the height regulations existing on the public roads. The wide cleaning arrangement 65 allows an increase in grain capacity compared to harvesters having a cleaning arrangement that is fitted between the front wheels or tracks, as it is the case in combine harvesters known today.

Figure 8A:
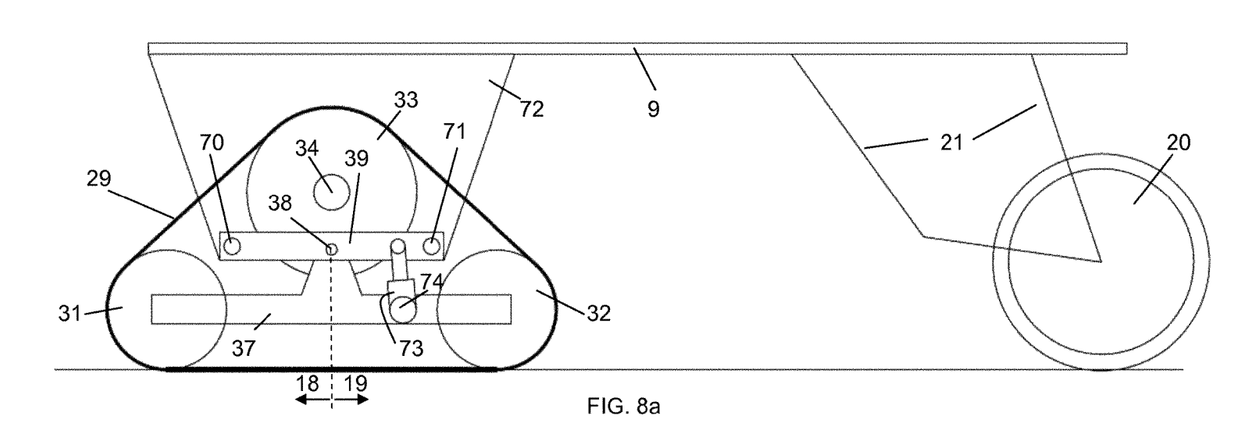
FIGS. 8a and 8b show two further embodiments involving triangular track units, according to the invention.

FIG. 8 shows another two embodiments involving triangular shaped track units. In the embodiment of FIG. 8a, the pivot axis of the track unit does not coincide with the rotation axis 34 of the central guide wheel 33. The track unit is pivotable about an axis 38 located underneath the rotation axis 34, on a horizontal beam 39 that is fixed to the harvester's chassis at connection points 70 and 71, in which points the beam 39 is fixed to a vertical structure 72 that is part of the chassis 9. The frame 37 of the track unit is pivotably attached to the beam 39 in pivot axis 38. Again, the pivot axis's location defines a front and rear portion 18/19 of the track unit. A variable length actuator 73 is mounted between the rear portion of the beam 39 (i.e. the portion behind the pivot axis) and a point 74 on the track unit's frame 37, the point 74 being located behind the pivot axis 38. Actuator 73 has the same function as in the previous embodiments, of actuating pivoting movement of the track unit by pushing down or pulling up the rear portion 19 of the track unit with respect to the beam 39, and thus with respect to the chassis 9. As an alternative, the actuator 73 may be mounted between the front portion of the beam 39 and the front portion of the track unit's frame 37, or two actuators may be mounted on either side of the pivot axis 38, between the beam 39 and the track unit's frame 37.

Figure 8B:
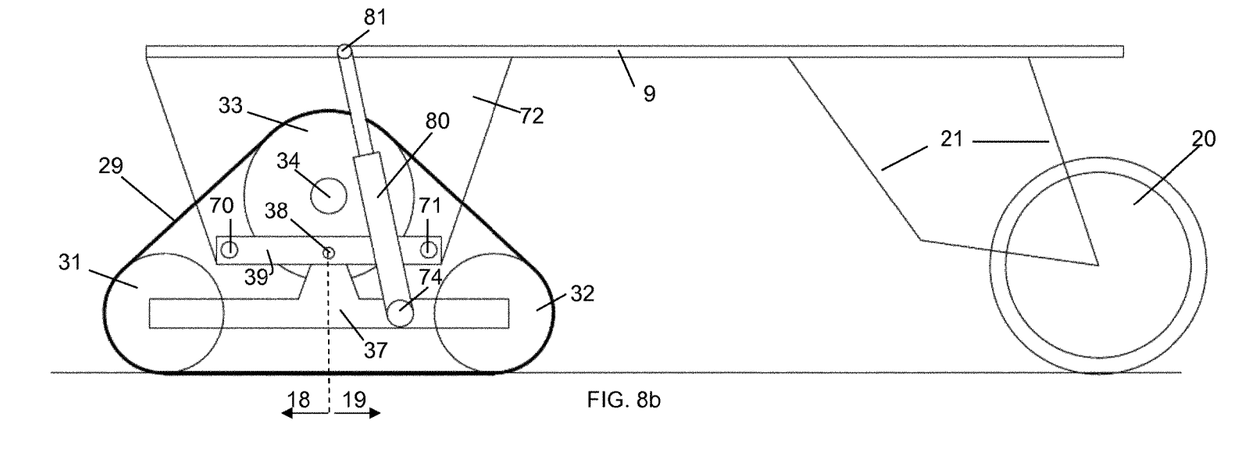

FIG. 8b shows an embodiment wherein the same type of triangular track unit as the one shown in FIG. 8a is provided with a variable length actuator 80 connected between the track unit's frame 37 (point 74 located behind the pivot axis 38) and a point 81 on the chassis 9 that is not located on the horizontal beam 39. This embodiment is similar to the embodiments of FIG. 3 except for the fact that the track unit is pivotable about an axis 38 that is different from the rotation axis 34 of the drive wheel.

In the above description, the emphasis has been on the counteracting of an excessive forward tilting of the track units by a variable length actuator, by pushing down the track unit's rear portion 19 (actuators 25,35,54,73,80) or pulling up the track unit's front portion 18 with respect to the harvester's chassis (actuator 60). It is clear however that the variable length actuators 25,35,54,60,73,80 described for this purpose may be capable also of actuating the reverse movement, i.e. pushing down the front portion 18 (actuators 25,35,54,73,80) or pulling up the rear portion 19 (actuator 60), to thereby counteract an excessive upward tilting of the track units. With most types of pneumatic or hydraulic actuators, actuation is possible in the upward as well as in the downward direction, so that upward as well as downward tilting can be actively controlled. It is however possible also to use an actuator capable only of actuating in one direction (towards or away from the chassis) or a combination of various actuator types. In any of the embodiments described above, the fact that the actuators 25, 35, 54, 60, 73 and 80 are shown as single piston/cylinder actuators does not preclude the possibility that in practice several actuators are used together to perform the above-described functions.

It is further noticed that a variable length actuator applicable in a harvester according to the invention is not limited to a pneumatic or hydraulic actuator, but may include any apparatus capable of exerting a force on the front and/or rear portion 18/19 of a track unit, said force pushing said portion away from the harvester's chassis or pulling it toward the chassis.

The invention is related to methods for operating a combine harvester according to the invention, equipped with ground engaging means of the track unit type or equivalent thereto, which are provided with actuators configured to actuate upward and/or downward tilting of the front portion of the ground engaging means with respect to the harvester's chassis. Preferably, the actuators will be operable manually from the harvester's cabin, so that the driver is able to activate the actuators and control the degree of activation whenever the track units are subjected to excessive tilting. On the basis of sensor measurements, the method may be described in terms of an automatic control procedure that can preferably still remain combined with manual operation of the actuators. When a sensor arrangement is provided that measures a parameter that is equal to or directly related to the actual tilting angle of the track unit, the method may comprise the steps of:

measuring the parameter, determining the downward or upward tilting of the front portion 18 of the ground engaging means, comparing the downward or upward tilting to a predefined value, counteracting the downward or upward tilting by activating the actuators (25,35,54,60,73,80). Possibly, the required force for the counteracting may be calculated before activating the actuator.

When a sensor is provided that predicts downward or upward tilting before it actually takes place, such as a pressure sensor in the header lift actuators or in the actuators 25/35/54/60 themselves, the method may comprise the steps of:

detecting an area in the terrain where excessive downward or upward tilting is likely to take place, for example by detecting a pressure drop in the header lift actuators, the pressure drop exceeding a predefined reference value, activating the actuators (25,35,54,60,73,80) in a precautionary manner, to counteract excessive downward or upward tilting as soon as it occurs.

According to an embodiment, the method of the invention monitors the longitudinal inclination of the harvester as a whole, and maintains the tilt angle of the ground engaging means at a value that is a pre-defined function of the inclination angle or at an angle that is in a range of values, said range having a pre-defined relation to the inclination angle. This method may comprise the steps of:

measuring the longitudinal inclination of the harvester, determining from said measurement a desired value of the tilt angle of the ground engaging means with respect to the harvester's chassis, measuring the tilt angle of the ground engaging means with respect to the harvester's chassis, if the measured and desired values are different, actuating the actuators (25,35,54,60,73,80) until the desired value is reached.

These methods can be applied together in a harvester equipped with several types of sensors (measuring tilt and predicting excessive tilt, measuring inclination of the harvester). These methods can be applied as software routines implemented in the harvester.

The invention claimed is:

1. A combine harvester comprising:
a chassis;
a pivotable ground engaging device comprising a front portion and a rear portion, the ground engaging device pivotable with respect to the chassis about an axis that is transversal to a longitudinal direction of the harvester, the axis lying between the front portion and the rear portion of the ground engaging device so that the front portion and the rear portion may be tilted up or down by pivoting of the ground engaging device;
a variable length actuator mounted between the chassis and the ground engaging device, the actuator configured to actuate upward or downward tilting of the front portion of the ground engaging device;
a detector for detecting a portion of terrain where an excessive downward or upward tilting of the front portion of the ground engaging device is likely to take place; and a controller for operating the variable length actuator on the basis of the detection of the portion of the terrain, so that an excessive downward or upward tilting of the front portion of the ground engaging device is compensated by operating the variable length actuator; and,
wherein the variable length actuator is a hydraulic or pneumatic actuator, and wherein the detector comprises one or more pressure sensors configured to measure a pressure in the variable length actuator.

2. The combine harvester according to claim 1, wherein the variable length actuator is mounted between the chassis and a point on the ground engaging device lying behind the transversal axis, the actuator being configured to be able to push the rear portion of the ground engaging device away from the chassis and to pull the rear portion towards the chassis, to thereby actuate upward and downward tilting of the front portion of the ground engaging device.

3. The combine harvester according to claim 1, wherein the variable length actuator or a further actuator is mounted between the chassis and a point on the ground engaging device lying in front of the transversal axis, the variable length actuator or the further actuator being configured to be able to pull the front portion towards the chassis or to push the front portion away from the chassis, to thereby actuate upward or downward tilting of the front portion of the ground engaging device.

4. The combine harvester according to claim 1, wherein the variable length actuator is a hydraulic or pneumatic actuator.

5. The combine harvester according to claim 1, wherein the ground engaging device is a flat track unit.

6. The combine harvester according to claim 1, wherein the ground engaging device is a triangular track unit.

7. The combine harvester according to claim 6, wherein the triangular track unit comprises a drive wheel and two guide wheels, the drive wheel being rotatable about a drive axis, and the triangular track unit being pivotable about the drive axis.

8. The combine harvester according to claim 6, wherein the triangular track unit comprises a drive wheel and two guide wheels, the drive wheel being rotatable about a drive axis, and wherein the triangular track unit is pivotable about a pivot axis that is situated below the drive axis.

9. The combine harvester according to claim 8, wherein the triangular track unit comprises a track unit frame that is pivotable about a beam attached to a vertical structure of the chassis, and wherein the variable length actuator is mounted between the track unit frame and the beam.

10. The combine harvester according claim 1, wherein the variable length actuator is integrated in a lifting or levelling system, configured to lift up the entire chassis or at least a front portion of the chassis over a given distance.

11. The combine harvester according to claim 10, further comprising a cleaning arrangement comprising a preparation pan and one or more sieves, and a threshing and separation arrangement, the cleaning arrangement being mounted underneath the threshing and separation arrangement and above the ground engaging device, and the cleaning arrangement having a functional width (W) being wider than the distance between the ground engaging device at a front of the combine harvester, the functional width being defined as the width of the preparation pan or the sieves, whichever is larger.

12. The combine harvester according to claim 1, further comprising a sensor arrangement for measuring a parameter that is representative of a downward or upward tilting of the front portion of the ground engaging device, and a controller for operating the variable length actuator on the basis of the measurement.

13. A combine harvester comprising:
   a chassis;
   a pivotable ground engaging device comprising a front portion and a rear portion, the ground engaging device pivotable with respect to the chassis about an axis that is transversal to a longitudinal direction of the harvester, the axis lying between the front portion and the rear portion of the ground engaging device so that the front portion and the rear portion may be tilted up or down by pivoting of the ground engaging device;
   a variable length actuator mounted between the chassis and the ground engaging device, the actuator configured to actuate upward or downward tilting of the front portion of the ground engaging device;
   a detector for detecting a portion of terrain where an excessive downward or upward tilting of the front portion of the ground engaging device is likely to take place;
   a controller for operating the variable length actuator on the basis of the detection of the portion of the terrain, so that an excessive downward or upward tilting of the front portion of the ground engaging device is compensated by operating the variable length actuator; and
   a header assembly and one or more header lift actuators arranged for lifting the header assembly,
   wherein the detector comprises one or more pressure sensors configured to measure a pressure in the one or more header lift actuators.

14. A method for operating a combine harvester according to claim 1, the method comprising the steps of:
   measuring the pressure in said variable length actuator representative of a downward or upward tilting of the front portion of the ground engaging device,
   determining the downward or upward tilting of the front portion of the ground engaging device,
   comparing the downward or upward tilting to a predefined value, and
   counteracting the downward or upward tilting by activating the variable length actuator.

15. A method for operating a combine harvester according to claim 14, the method comprising the steps of:
   detecting an area in the terrain where excessive downward or upward tilting is likely to take place; and
   activating the variable length actuator in a precautionary manner, to counteract excessive downward or upward tilting as soon as it occurs.

16. A method for operating a combine harvester according to claim 1, the method comprising the steps of:
   measuring a longitudinal inclination of the harvester,
   determining from the measurement a desired value of a tilt angle of the ground engaging device with respect to the chassis,
   measuring the tilt angle of the ground engaging device with respect to the chassis, and
   if the measured and desired values are different, actuating the variable length actuator until the desired value is reached.

* * * * *